United States Patent

[11] 3,582,156

| [72] | Inventors | Otto Korner<br>Remscheid;<br>Hagen-Heinz Wiesner, Burg/Wupper, both of, Germany |
|---|---|---|
| [21] | Appl. No. | 806,185 |
| [22] | Filed | Mar. 11, 1969 |
| [45] | Patented | June 1, 1971 |
| [73] | Assignee | Diehl K. G.<br>Remscheid, Germany |
| [32] | Priority | Mar. 12, 1968 |
| [33] | | Germany |
| [31] | | 1,680,324 |

[54] CONNECTOR FOR TRACK-LAYING CHAINS
6 Claims, 2 Drawing Figs.

[52] U.S. Cl. .................................................. 305/56,
305/58
[51] Int. Cl. ..................................................... B62d 55/28
[50] Field of Search........................................... 305/36, 35,
58, 56

[56] References Cited
UNITED STATES PATENTS

| 2,089,210 | 8/1937 | Knox ............................ | 305/36 |
| 2,933,351 | 4/1960 | Backhaus ..................... | 305/56 |
| 3,467,446 | 9/1969 | Seelbach ...................... | 305/58 |

OTHER REFERENCES
Krick - German printed application No. 1,228,957 305-35

*Primary Examiner*—Richard J. Johnson
*Attorney*—Walter Becker

ABSTRACT: A structure for interconnecting adjacent track chain links arranged in spaced relationship to and one behind the other, according to which bearing bolts respectively arranged in adjacent end portions of adjacent track chain links are received by a connector which has a first member for receiving said bearing bolts and has a second member adapted to be clamped against said bolts for clamping the latter between said first and second members.

PATENTED JUN 1 1971

3,582,156

INVENTOR.
Otto KÖRNER
Hagen-Heinz WIESNER

BY

CONNECTOR FOR TRACK-LAYING CHAINS

The present invention relates to a track chain in which the bearing bolts of adjacent track chain links, which are of a tubular shape and are particularly wide while being equipped at their central portion especially with a cast-on or otherwise connected guiding tooth, have their laterally protruding ends coupled to each other by means of connectors.

With connection track chains of the above-mentioned type, the entire pulling stress is conveyed through the pivots of the bearing bolts and the connectors. With very wide chains, two chain links are arranged adjacent to each other and a connector is slipped over the bearing bolts so that the chain will also be connected in its central portion.

It is an object of the present invention to provide means which will make it possible to connect particularly wide chain links, which are provided in the central portion with a guiding tooth and which pertain to a connector link chain, also between the outer connectors, especially in the central portion.

Figure 1:
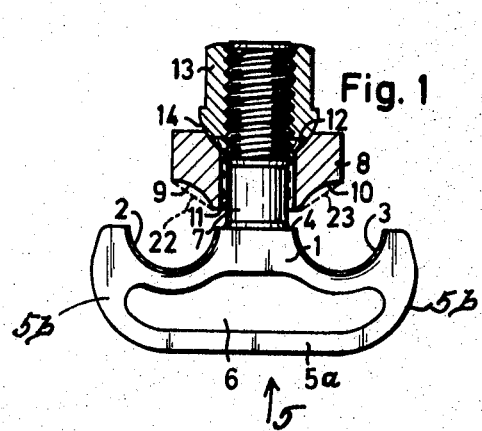

This object and other objects and advantages of the invention will appear more clearly from the following specification in connection with the accompanying drawings, in which:

FIG. 1 is a side view, partially sectioned, of a screw connector according to the present invention.

Figure 2:
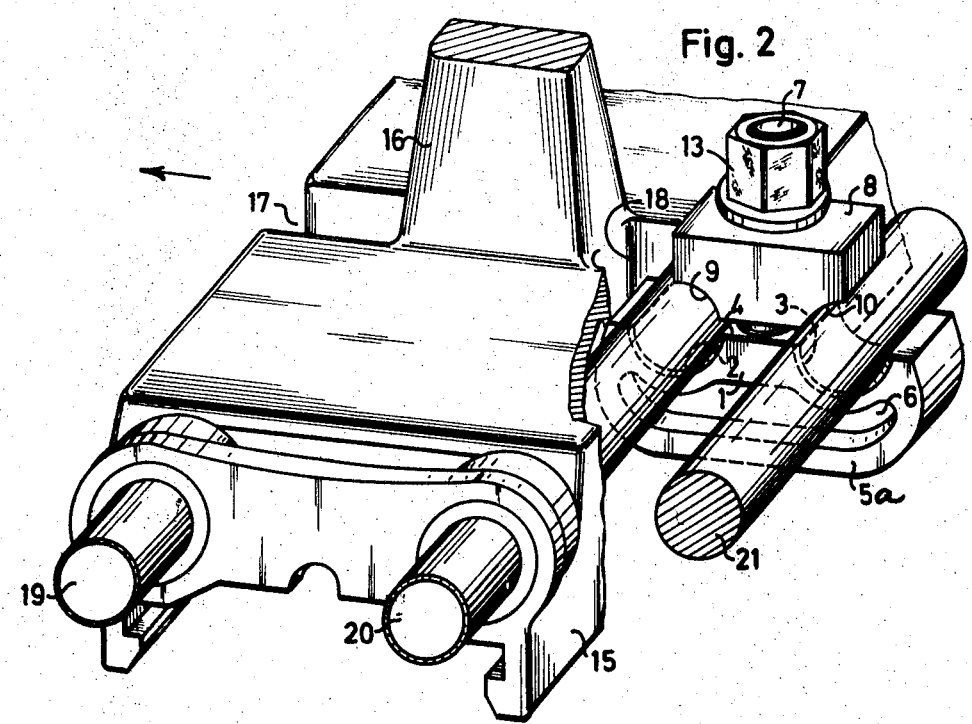

FIG. 2 is an isometric view of a track chain link with a connector according to FIG. 1. The track chain according to the present invention in which the bearing bolts of adjacent track chain links which are of tubular shape and pertain to superwide track chain links and have their central portion provided preferably with a cast-on or otherwise connected guiding tooth, have their laterally protruding ends coupled to each other by a connector, is characterized primarily in that the chain links, approximately at the central portion thereof, preferably within the area of the guiding tooth, are provided with recesses through which extend the bearing bolts and into which there is insertable a horizontally divisible screw connector which extends over the bearing bolts, said screw connector comprising at least one lower connecting element which is provided with semibores corresponding to the diameter of the bearing bolts, whereas from above a clamping member can be screwed for pulling the connecting bearing against the bearing bolt.

The connector may at its central portion have an upwardly extending threaded shank which may be forged to the lower part of the connector. This threaded portion receives a clamping member the upper side of which within the area of a central bore forms a spherical socket adapted to be engaged by a nut with a corresponding spherical surface for clamping the clamping member against the bearing bolt. The clamping member may be provided with curved surfaces corresponding to approximately one-fourth of the cross section of the bolts and arranged in such a way that the curved surfaces will extend at least to the central plane parallel to the axis of the screw shank when the connector is fully assembled.

In order to secure unilaterally flattened bearing bolts against rotation, the clamping member may, instead of being provided with the said curved surfaces, have plane surfaces which form a secant to the respective curved surface of the clamping member.

For reinforcing the lower portion of the screw connector there is provided a reinforcing member the central portion of which faces the clamping member and is plane toward the latter and laterally of said plane surface has marginal areas curved in conformity with the bolt to be received or engaged thereby. This upper portion of the reinforcing member has connected thereto a portion which is arched toward the outside and has a substantially plane central portion while defining with the other portion a hollow chamber.

Referring now to the drawing in detail, the screw connector shown in FIG. 1 comprises a first member 1 with two parallel grooves 2, 3 of semicircular cross section and furthermore comprises therebetween a plane surface 4. The lower portion of said screw connector also comprises a reinforcing section 5 which together with the upper section 1 defines a hollow chamber 6. This reinforcing member 5 has a central substantially plane portion 5'a and has lateral portions 5b which are arched and connected to the section 1. The entire lower portion 1—5 consists of a single unitary steel portion. Connected to the lower portion 1, preferably forged thereon, is a screw shank 7. This screw shank 7 is adapted to receive an upper member in the form of a clamping member 8 which at both sides is provided with clamping surfaces 9, 10 facing the grooves 2, 3. The radius of the clamping surfaces 9, 10 corresponds to the radius of the grooves or channels 2, 3. The clamping member 8 extends at least up to approximately the plane of symmetry of the channels 2, 3. If desired, the clamping member 8 can be designed somewhat similar to the lower member 1. The central portion of the clamping member 8 is provided with a bore 11 merging at its upper end with a spherical cup-shaped recess 12.

For purposes of clamping the clamping member 8 onto the screw shank 7, there is provided a nut 13 with a spherical collar 14 for compensating for any difference in tolerance or for slight inclinations of the clamping member 8 with regard to the lower member 1. In this way, no bending forces have to be absorbed by the screw shank 7.

Instead of being provided with the curved surfaces 9, 10 having the contour of a quarter of a circle forming the contour of the channels 2, 3, the clamping member 8 may be provided with plane surfaces 22, 23 forming the secant to the respective curved surfaces 9, 10.

FIG. 2 illustrates the assembly and mounting of the above mentioned screw connector 1—14 to the or between the track chain links. The tubular chain link 15 has its central portion provided with a guiding tooth 16 cast thereon. Ahead of and behind the said guiding tooth 16, the superwide chain link 15 is respectively provided with recesses 17, 18 where the bearing bolts 19, 20 are exposed. The ends of said bolts 19, 20 protrude laterally from the chain links 15. These protruding portions carry in a manner known per se the chain links of connectors coupled to each other. A central connector according to FIG. 1 is inserted into the recess 18 in such a way that the channel 2 engages the bearing bolt 20 from below up to the central plane which is parallel to the central member 5a. The channel 3 similarly engages a bearing bolt 21 of an adjacent chain link not shown. Such central screw connector 1—14 is similarly inserted into the recess 17 for engagement with the bearing bolt 19.

Particularly when employing the above mentioned connector as end connector for coupling track chain links to each other, the bearing bolts of which are unilaterally flattened, a clamping member 8 with secantlike surfaces 22, 23 will be particularly advantageous. When clamping fast the clamping member 8 by means of the nut 13, 14, the surfaces 22, 23 engage the surface on the bearing bolts so that the latter cannot rotate.

As will be evident from the above, the central connector according to the present invention distributes the pulling forces uniformly over the chain and, more specifically, the width thereof. The lower portion of the connector which by means of its channels 2, 3 engages the bearing bolts 19, 20 and holds the same fast, acts like a connector placed upon the ends of the bearing bolts. The clamping member presses the bearing bolts firmly into the channels 2, 3 so that the pulling forces resting on the bearing bolts and acting in the direction of movement of the chain are through the lower portion of the central connector fully conveyed to the next bearing bolt. In view of the outer reinforcement of the lower portion of the connector, it will be assured that the latter will not deform under pulling stresses, which means that the channels 2, 3 of semicircular cross section will not be widened. This connector may, whenever desired, be unscrewed by the operator or a passenger of the track laying vehicle without special tools.

It is, of course, to be understood that the present invention is, by no means, limited to the particular construction shown in the drawing but also comprises any modifications within the scope of the appended claims.

What we claim is:

1. In combination: two track chain links arranged in spaced relationship to and one behind the other, those end portions of said links which face each other respectively being provided with transverse bearing bolts having their central portions exposed toward each other, and a screw connector comprising a first member provided with recess means for receiving exposed portions of said bearing bolts and also comprising a second member operable selectively to engage and clamp the respective bearing bolt portions received by said first member between said first and second members, said first member having its central portion provided with an upwardly extending threaded shank, said second member including an annular part freely movable over said shank and having that end face thereof which faces away from said first member provided with a spherical surface portion, said structure also including a nut threadedly engaging the threaded portion of said shank and having that end face of the nut which faces said annular part provided with a spherical surface portion slidably fitting into and engaging said spherical surface portion of said annular part, said first member with said recess means forming a single forged entity with said shank.

2. A structure according to claim 1, in which each of said recess means forms a groove extending in axial direction of the respective bearing bolts received therein and has a cross-sectional curvature corresponding to the cross-sectional outer circumferential contour of the respective bearing bolts received therein.

3. A structure according to claim 2, in which that end face of said second member which faces said first member is provided with spaced curved surface portions each having a cross-sectional contour radially equalling at least one-quarter of the circle defining the circumference of the respective bearing bolt.

4. A structure according to claim 1, in which that surface of said annular member which faces said first member is provided with substantially plane surfaces flaring in a direction transverse to the longitudinal direction of said recess means.

5. A connector for interconnecting the central portions of two serially arranged track chain links, which includes: a first member having a central portion with a threaded shank and also having recess means arranged at opposite sides of said shank and extending in a direction substantially at a right angle with regard to the longitudinal extension of said shank for receiving bearing bolts, said first member forming a hollow body with those end faces thereof curved which extend reinforced in the axial direction of said recess means, an additional member freely movable on said shank and having that end face thereof which faces away from said first member provided with a spherical socket, and nut means threadedly engaging said shank and having a spherical end face portion corresponding to and engaging said socket, said nut being adapted selectively to be moved toward said first member for uniformly clamping bolts received simultaneously in said recess means between said first member and said additional member.

6. A connector according to claim 5, in which said first member has said recess means as two parallel grooves of semicircular cross section on opposite sides of a plane surface to one side of said shank, a reinforcing section which together with said central portion forms the hollow body in a single forged entity with said shank, said additional member having clamping surfaces facing on opposite sides toward said parallel grooves, each clamping surface having a radius corresponding to that radius of the respective groove for at least one-quarter of a circle defined by the respective radius.